US012177313B2

(12) United States Patent
Lisboa Penz et al.

(10) Patent No.: US 12,177,313 B2
(45) Date of Patent: *Dec. 24, 2024

(54) CAPTIVE PORTAL REDIRECTION BY DEVICES WITH NO INTERNET PROTOCOL CONNECTIVITY IN THE HOST VIRTUAL LOCAL AREA NETWORK

(71) Applicant: ARISTA NETWORKS, INC., Santa Clara, CA (US)

(72) Inventors: Leandro Lisboa Penz, Dublin (IE); Arun Ajith Surendranath, Kerala (IN); Ganesan Rajagopal, Karnataka (IN); Manish Singhvi, Rajasthan (IN)

(73) Assignee: Arista Networks, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,849

(22) Filed: Jun. 15, 2023

(65) Prior Publication Data
US 2023/0412702 A1    Dec. 21, 2023

Related U.S. Application Data

(63) Continuation of application No. 17/156,310, filed on Jan. 22, 2021, now Pat. No. 11,722,578.

(30) Foreign Application Priority Data

Nov. 27, 2020   (IN) .............................. 202041051715

(51) Int. Cl.
*H04L 67/563*      (2022.01)
*H04L 45/00*       (2022.01)
(Continued)

(52) U.S. Cl.
CPC ............ *H04L 67/563* (2022.05); *H04L 45/66* (2013.01); *H04L 45/742* (2013.01); *H04L 45/745* (2013.01); *H04L 2212/00* (2013.01)

(58) Field of Classification Search
CPC ..... H04L 67/563; H04L 45/66; H04L 45/742; H04L 45/745; H04L 2212/00
See application file for complete search history.

(56) References Cited

U.S. PATENT DOCUMENTS 9,634,987 B2 *  4/2017  Esdaile ............... H04L 61/4511
11,722,578 B2 *  8/2023  Penz ...................... H04L 45/66
                                                                370/392
(Continued)

*Primary Examiner* — Kibrom T Hailu
(74) *Attorney, Agent, or Firm* — Sprinkle IP Law Group

(57) ABSTRACT

In general, the disclosure relates to a method for redirecting a user to a captive portal. The method includes trapping an incoming frame originating from a host, where the incoming frame comprises a L2 header and a payload, wherein the payload specifies information associated with an external server, wherein the user of the host has not been authenticated by the captive portal at a time when the incoming frame is trapped, extracting the L2 header, an L3 header, and the payload from the incoming frame, forwarding the L3 header and the payload towards a redirection server executing on the network device, wherein the redirection server is configured to generate a redirection response based on the payload; encapsulating the redirection response to obtain an L3 response packet, encapsulating the L3 response packet using information from the L2 header to obtain an output frame, and transmitting the output frame towards the host.

20 Claims, 8 Drawing Sheets

(51) Int. Cl.
    *H04L 45/74*     (2022.01)
    *H04L 45/745*     (2022.01)

(56) References Cited

U.S. PATENT DOCUMENTS

2015/0373688 A1* 12/2015 Samuel Raj .......... H04L 63/108
    370/329
2019/0007316 A1* 1/2019 Congdon ............ H04L 61/2557

* cited by examiner

CAPTIVE PORTAL REDIRECTION BY DEVICES WITH NO INTERNET PROTOCOL CONNECTIVITY IN THE HOST VIRTUAL LOCAL AREA NETWORK

This application is a continuation of, and claims a benefit of priority under 35 U.S.C. § 120 from, U.S. patent application Ser. No. 17/156,310, filed Jan. 22, 2021, issued as U.S. Pat. No. 11,722,578, entitled "CAPTIVE PORTAL REDIRECTION BY DEVICES WITH NO INTERNET PROTOCOL CONNECTIVITY IN THE HOST VIRTUAL LOCAL AREA NETWORK," which claims priority to Indian application No. 202041051715 filed Nov. 27, 2020, both of which are fully incorporated by reference herein for all purposes.

BACKGROUND

Network devices (e.g., switches) include functionality to enable a user (via a host) to access external servers operatively connected to the network devices over a network. In certain scenarios, a user needs to be authenticated prior to the network device(s) permitting the user to access the external servers.

SUMMARY

In general, in one aspect, the disclosure relates to a method for redirecting a user to a captive portal, the method comprising: trapping, by network device hardware, an incoming frame originating from a host, wherein the incoming frame comprises a layer 2 (L2) header and a payload, wherein the payload specifies information associated with an external server, wherein the user of the host has not been authenticated by the captive portal at a time when the incoming frame is trapped, extracting, by an L2 forwarder, the L2 header, an L3 header, and the payload from the incoming frame, forwarding, after the extracting, the L3 header and the payload towards a redirection server executing on the network device, wherein the redirection server is configured to generate a redirection response based on the payload, encapsulating the redirection response to obtain an L3 response packet, encapsulating the L3 response packet using information from the L2 header to obtain an output frame, wherein the L3 response packet comprises a second L3 header, wherein prior to encapsulating the L3 response packet the L3 header specifies an external server Internet Protocol (IP) address as a source IP address and a host IP as the destination IP address; and transmitting the output frame towards the host.

In general, in one aspect, the disclosure relates to a network device, comprising network device hardware comprising a processor, and memory comprising instructions which, when executed by the processor, perform a method, the method comprising: trapping, by the network device hardware, an incoming frame originating from a host, wherein the incoming frame comprises a layer 2 (L2) header and a payload, wherein the payload specifies information associated with an external server, wherein the user of the host has not been authenticated by a captive portal at a time when the incoming frame is trapped, extracting, by an L2 forwarder, the L2 header, an L3 header, and the payload from the incoming frame, forwarding, after the extracting, the L3 header and the payload towards a redirection server executing on the network device, wherein the redirection server is configured to generate a redirection response based on the payload, encapsulating the redirection response to obtain an L3 response packet, encapsulating the L3 response packet using information from the L2 header to obtain an output frame, wherein the L3 response packet comprises a second L3 header, wherein prior to encapsulating the L3 response packet the L3 header specifies an external server Internet Protocol (IP) address as a source IP address and a host IP as the destination IP address, and transmitting the output frame towards the host.

In general, in one aspect, the disclosure relates to a method for redirecting a user to a captive portal, the method comprising: trapping an incoming frame originating from a host, wherein the incoming frame comprises a layer 2 (L2) header and a payload, wherein the payload specifies information associated with an external server, wherein the user of the host has not been authenticated by the captive portal at a time when the incoming frame is trapped, processing the incoming frame to obtain an L3 packet, wherein the L3 packet comprises a private IP address as a destination address and the payload, transmitting the L3 packet towards a redirection server executing on the network device, wherein the redirection server is configured to generate the redirection response based on the payload, generating, after the transmitting, a second L3 packet specifying the external server IP address as a source IP address of the second L3 packet and comprising the redirection response, encapsulating the second L3 packet using the L2 header to obtain an output frame, and transmitting the output frame towards the host.

DETAILED DESCRIPTION

Figure 1:
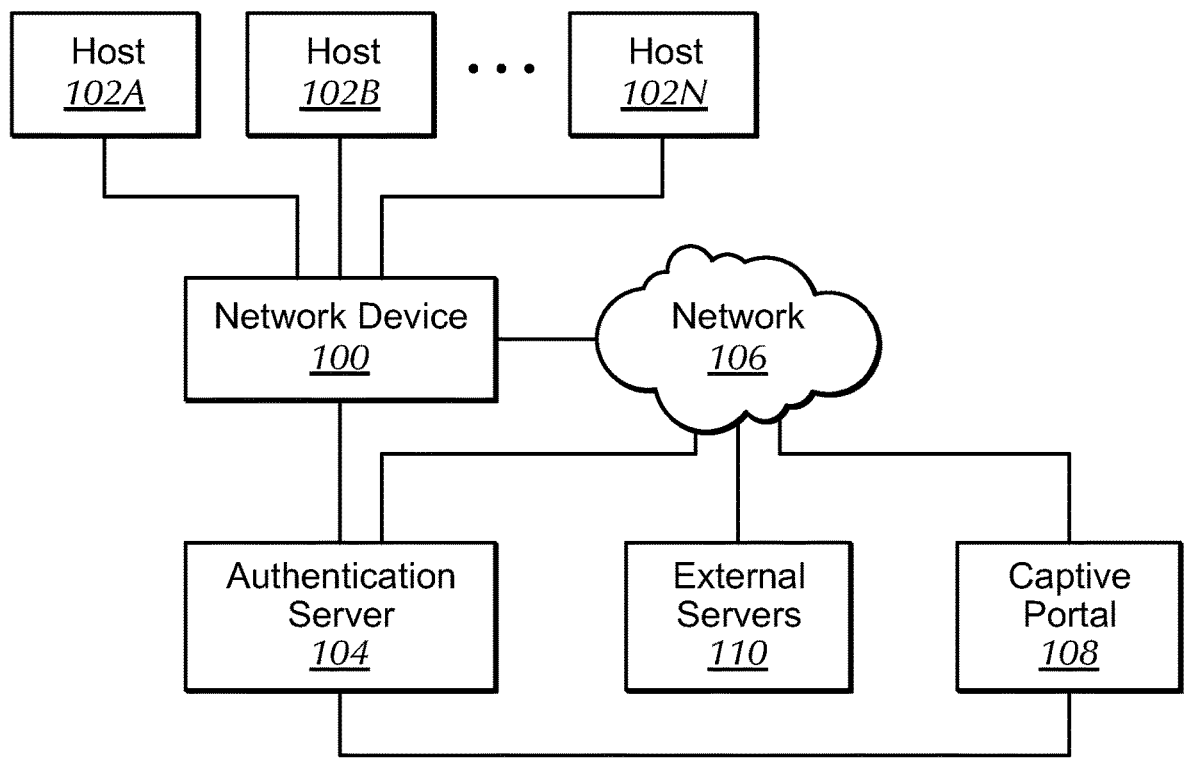
FIG. 1 shows an example system in accordance with one or more embodiments of the disclosure described herein.

Web authentication offers a way for authentication of devices not otherwise able to authenticate under the IEEE 802.1X protocol or authentication under the IEEE 802.1X protocol is insufficient. Web authentication may be required prior to granting a user access to a network in its entirety subject to network policy restrictions for the user; otherwise, parts of the network are considered off-limits to an unauthenticated user. An authenticator device (e.g., a switch) in operational communication with a host may facilitate the user authorization. A captive portal feature, generally a software implementation, blocks an unauthorized user from accessing the entirety of the network until user authentication has been successfully performed. Authenticated users are validated, e.g., using a database of authorized captive portal users before access is granted to the entire network subject to network policy restrictions for the user through the authenticator device.

Consider the scenario where an unauthorized user, via a host, attempts to access a web page through an authenticator device implementing captive portal authentication functionality. In this scenario, the user, via the host, is required to complete successful authentication at the web page (i.e., the captive portal) through the authenticator device before accessing the network. In some cases, user authentication may be part of a two-step authentication process. At a first step of the authentication process, the host is authenticated by an authentication server and at a second step of the authentication process, the user is authenticated through the captive portal. Without successful completion of the first authentication step, the user is not and cannot be authenticated at the second authentication step of the authentication process. Successful authentication at the first step grants access to the network but only on a limited basis. Without successful authentication at the second step, the user is left with limited network access without enjoying the benefit of the entirety of the network subject to network policy restrictions for the user. For example, while the user may have the benefit of browsing the network, the user may be shut out of certain web pages.

When a physical port on the authenticator device is enabled for captive portal authentication, the port is set in a captive-portal-enabled state where all the traffic coming to the port from the unauthenticated user is dropped except for certain traffic. For example, the type of traffic that is allowed to flow through may be a system administrator choice. In another example, non-data traffic packets, such as the address resolution protocol (ARP), dynamic host configuration protocol (DHCP), domain name system (DNS) and network basic input/output system (NETBIOS) packets, may be allowed to flow through. The authenticator device forwards the traffic that is allowed to flow through in order to allow the unauthenticated client to obtain an IP address and resolve the desired hostname or domain name.

Upon successful completion of the first authentication step, the user, via the host, attempts to access a web page, for example, the host issues a hypertext transfer protocol (HTTP or HTTPS) request specifying the web page. Upon receipt of this HTTP[S] request, the authenticator device determines that the host that issued the HTTP[S] request is not completely authorized (e.g., the second step of the authentication process remains incomplete) and initiates a HTTP[S] response redirecting the user (via the host) to a captive portal for authentication. The HTTP[S] response is the redirect message that points the browser executing on the host to the captive portal. In order to generate such an HTTP[S] response, the authenticator device requires the allocation of an internet protocol (IP) address in the host's virtual local access network (VLAN), where such IP addresses are limited resources. In some cases, the authenticator device allocates an IP address in a VLAN-free environment.

To address the aforementioned issues, a system and method for facilitating an IP connectivity-free authentication process to authenticate a user desirous of accessing a network in its entirety through a captive portal is disclosed. A network device situated between one or more hosts and the captive portal, which is operationally coupled to an external server(s) (e.g., servers hosting or in operational communications with web pages the user is desirous to access), facilitates redirection of a HTTP[S] request (e.g., a request to access a webpage) to the captive portal to assist a host achieve user authentication. The network device, in accordance with various embodiments of the disclosure, uses an operating system to facilitate the transfer of the HTTP[S] request from the host to an internal redirection server without reserving an IP address in the host VLAN. In an embodiment of the disclosure, an address in the loopback subnet (e.g., 127.X.X.X) is used as the private IP address. In this embodiment, the private IP address is any IP address that does not conflict with other interfaces or processes in the network operating system (NOS). In another embodiment of the disclosure, a private IP address need not be reserved and the redirection server can respond using the original destination address in the packet, e.g., when implemented using a transparent proxy. By using the various embodiments of the disclosure, the network device does not need to manage the allocation of IP addresses within the VLANs of the hosts that are issuing the HTTP[S] requests; rather, the network device is able to respond using the same internal/private IP address for all HTTP[S] requests that the network device processes for redirection regardless of the VLANs in which the hosts are located. In this manner, the overhead associated with the allocation of IP addresses in the VLANs of the hosts that issued the HTTP[S] requests are eliminated (or at least substantially reduced). Details about various embodiments are provided in the figures below.

Various embodiments of the disclosure are described below.

FIG. 1 shows an example system in accordance with one or more embodiments of the disclosure. The system includes a network device (100) communicatively coupled to one or more, up to an N number of hosts (102A, 102B, . . . , 102N), a network (106), and an authentication server (104). Network device (100) is operationally coupled to captive portal (108) and an external server(s) (110) through network (106). Network device (100) is further operationally coupled to authentication server (104). Further, the captive portal (108) and the authentication server (104) are directly or operationally coupled. Each of these components is described below.

In one embodiment of the disclosure, the captive portal (108) and the authentication server (104) may be co-located. For example, the captive portal (108) may be part of, in direct communication with, or in operational communication with the authentication server (104).

In one embodiment of the disclosure, the network device (100) may be one or more computing devices functionally equipped to facilitate redirection of a HTTP[S] request to a captive portal to achieve user authentication, step two of an authentication process.

In one embodiment of the disclosure, the network device (100) is a physical or virtual device that may be used for performing various embodiments of the disclosure. The physical device may correspond to any physical system with functionality to implement one or more embodiments of the disclosure. For example, the physical device may be a switch (i.e., a device with at least one or more processor(s), memory, and an operating system) that is directly (or operatively, e.g., via the network) connected to at least one host (e.g., 102A, 102B, . . . , 102N), an authentication server (e.g., 104), and to a captive portal (e.g., 108), and an external server(s) (e.g., 110).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the network device (100) includes executable instructions (stored in a non-transitory computer readable medium (not shown)), which when executed, enable the network device (100) to perform one or more methods described below (see e.g., FIGS. 3A-5B). Additional detail about the network device is described below with respect to FIG. 2.

In one embodiment of the disclosure, the network device (100) is a physical device that includes persistent storage, memory (e.g., random access memory), one or more processor(s), and two or more physical ports that may be a combination of ingress and egress ports.

In one embodiment of the disclosure, the persistent storage in the network device may include any type of non-transitory computer readable medium that includes instructions, which, when executed by one or more processor(s) in the network device, enable the network device to perform all or a portion of the functions described in accordance with one or more embodiments of the disclosure (see e.g., FIGS. 3A-5B).

Examples of a network device include, but are not limited to, a router, a switch, and a multilayer switch. The network device is not limited to the aforementioned specific examples. Additional detail about a network device is described below with respect to FIG. 2.

In one embodiment of the disclosure, the network (106) may be the medium through which the network device (100), the hosts (102A, 102N), the authentication server (104), the captive portal (108), and the external server(s) (110) are operatively connected. In one embodiment of the disclosure, the network may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

In one embodiment, each of the host (e.g., 102A-102N) may be one or more computing devices functionally equipped to transmit one or more HTTP[S] requests intended for one of the external servers (110) to ultimately achieve access to a network.

In one embodiment of the disclosure, each of the hosts (102A-102N) is a physical or virtual device that may be used for facilitating performing various embodiments of the disclosure. The physical device may correspond to any physical system with functionality to implement one or more embodiments of the disclosure. For example, the physical device may be a personal computer, a laptop, a smartphone, or a tablet (i.e., a device with at least one or more processor(s), memory, and an operating system) that is directly or otherwise connected to a network device (100).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the host (e.g., 102A, 102B . . . 102N) includes executable instructions (stored in a non-transitory computer readable medium (not shown)), which when executed, enable the corresponding host (e.g., 102A, 102B . . . or 102N) to perform one or more methods described below (see e.g., FIGS. 3A-5B). Additional detail about the host is described below with respect to FIG. 6.

In one embodiment of the disclosure, a host may include functionality for storing commands obtained from internal or external application(s) for transmission of HTTP[S] requests to a network device (e.g., network device (100)).

In one embodiment of the disclosure, the external server(s) (e.g., 110) is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or otherwise connected to a network device (e.g., the network device (100)).

In one or more embodiments of the disclosure, the external servers (110) host one or more web pages. These webpages are the target of the HTTP[S] requests issued by the host.

In one embodiment of the disclosure, the captive portal (e.g., 108) may be a web page where a user may enter authentication credentials for allowing the user access to a network that is otherwise, at least in part, blocked to the user. The captive portal may be implemented with executable instructions (stored in a non-transitory computer readable medium (not shown)), which when executed, enable a processor (not shown) to implement a web page onto which a client may be authenticated.

In one embodiment of the disclosure, the captive portal implements functionality for receiving user authentication credentials (e.g., username and password) from one of the hosts (102A-102N) through the network device (100) and the network (106), and validating the received user authentication credentials against a database of captive portal authentications. That is, the captive portal identifies the authentication session through an authentication server (e.g., 104, in FIG. 1) and records the user authentication credentials. Session authentication may be based on where the user authentication credentials are entered. For example, the captive portal may be expecting to receive the user authentication credentials at a predefined location of the web page displayed on a screen of a server or a computer. The captive portal may compare the user authentication credentials, received via a host (e.g., 102A-102N), e.g., to an internal database of captive portal authentications. In response to a match determination between the user authentication credentials and the captive portal authentications, the captive portal reports successful user authentication to an authentication server (e.g., 104) and the user is ultimately granted access to a network. In response to finding no match between the user authentication credentials and the database of captive portal authentications, a user is blocked from full access to the network.

In one embodiment of the disclosure, the authentication server (e.g., 104, in FIG. 1) is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or operationally connected to a network device (e.g., the network device (100)) and a captive portal (e.g., the captive portal (108)).

In one embodiment of the disclosure, the authentication server (e.g., 104, in FIG. 1) includes executable instructions (stored in a non-transitory computer readable medium (not shown)), which when executed, upon successful completion of a user authentication session by a captive portal (e.g., 108), issues a change of authorization (CoA) message to the network device to complete the authentication to enable unrestricted access to a previously restricted network.

In one or more embodiments of the disclosure, the authentication server (104) may be implemented as any type of server with functionality for performing the methods and embodiments of the disclosure. The authentication server (104) may authenticate a user in various manners including in accordance with the IEEE 802.1X protocol—Extensible Authentication Protocol over Local Area Network (EAPoL) or MAC-based authentication (e.g., via the remote authentication dial-in service (RADIUS) protocol). The authentication server (104) may implement further functionality such as receiving authentication status from a captive portal (e.g., 108).

In one embodiment of the disclosure, the authentication server (104) includes executable instructions (stored in a non-transitory computer readable medium (not shown)), which when executed, enable the authentication server (104) to perform one or more methods described below (see e.g., FIGS. 3A, 3B).

While FIG. 1 shows a particular system architecture, the disclosure is not limited to the system architecture shown in FIG. 1. For example, while FIG. 1 shows one authentication server, one captive portal, and one network device, implementations of the disclosure may include one or more of each of the aforementioned elements without departing from the disclosure.

Figure 2:
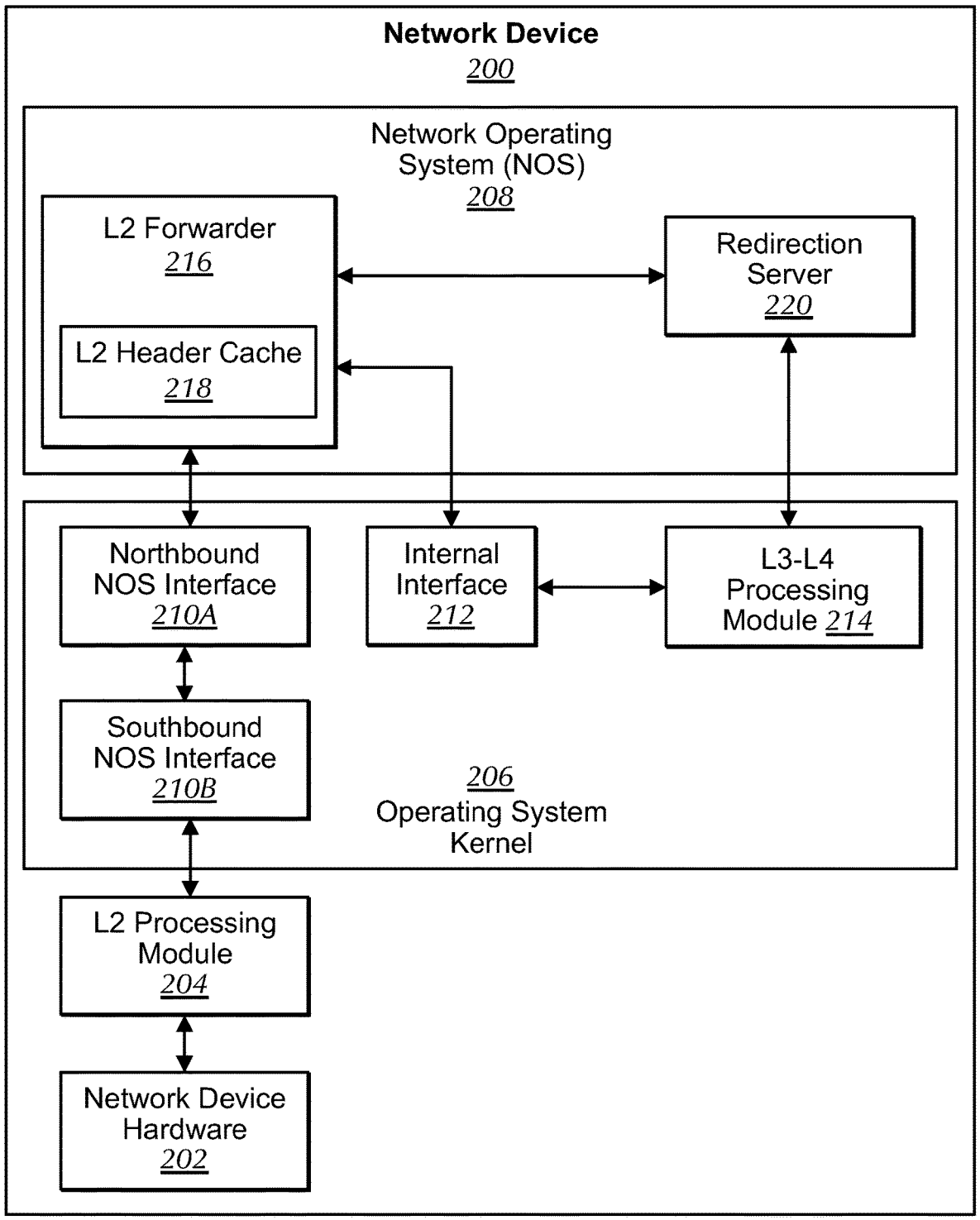
FIG. 2 shows a diagram of a network device in accordance with one or more embodiments of the disclosure disclosed herein.

FIG. 2 shows a network device in accordance with one or more embodiments of the disclosure. In one embodiment of the disclosure, a network device (200) includes network device hardware (202), an L2 network processing module (204), an operating system kernel (206), and a NOS (208). In one embodiment of the disclosure, the network device (200) may correspond to the network device (100) of FIG. 1.

In one embodiment of the disclosure, the operating system kernel (206) includes a northbound NOS interface (210A), a southbound NOS interface (210B), an internal interface (212), and an L3-L4 processing module (214). In one embodiment of the disclosure, the NOS (208) includes a L2 forwarder (216) and a redirection server (220). The L2 forwarder (216) includes a L2 header cache (218). In one embodiment of the disclosure, the NOS (208) is an operating system that includes functionality to manage the operation of the network device (200). This functionality includes the software components (or modules) required to implement frame and/or packet processing as described throughout this disclosure. Further, as part of the frame and/or packet processing, the NOS includes functionality to implement one or more protocols. Examples of protocols include, but are not limited to, Multi-Chassis Link Aggregation (MLAG), link aggregation groups (LAGs), Virtual Extensible Local Area Network (VXLAN), Link Layer Discovery Protocol (LLDP), tap aggregation, data center bridging capability exchange, Access Control List (ACL), Virtual Local Area Network (VLAN), Virtual Router Redundancy Protocol (VRRP), Virtual-Address Resolution Protocol (VARP), Spanning Tree Protocol (STP), Open Shortest Path First (OSPF), Border Gateway Protocol (BGP), Routing Information Protocol (RIP), Building Distribution Frame (BDF), Multi-Protocol Label Switching (MPLS), Protocol-Independent Multicast (PIM), Internet Control Message Protocol (ICMP), and Internet Group Management Protocol (IGMP).

Continuing with the discussion of FIG. 2, additional detail about each of the components illustrated in FIG. 2 is described below.

In one embodiment of the disclosure, the network device (200) includes executable instructions (stored in a non-transitory computer readable medium (not shown)), which when executed, enable the network device (200) to perform one or more methods described below (see e.g., FIGS. 3A, 3B). In one embodiment, the network device (200) includes executable instructions, which when executed, enable the network device (200) to implement one or more components of the operating system kernel (206) and the NOS (208).

Figure 3A:
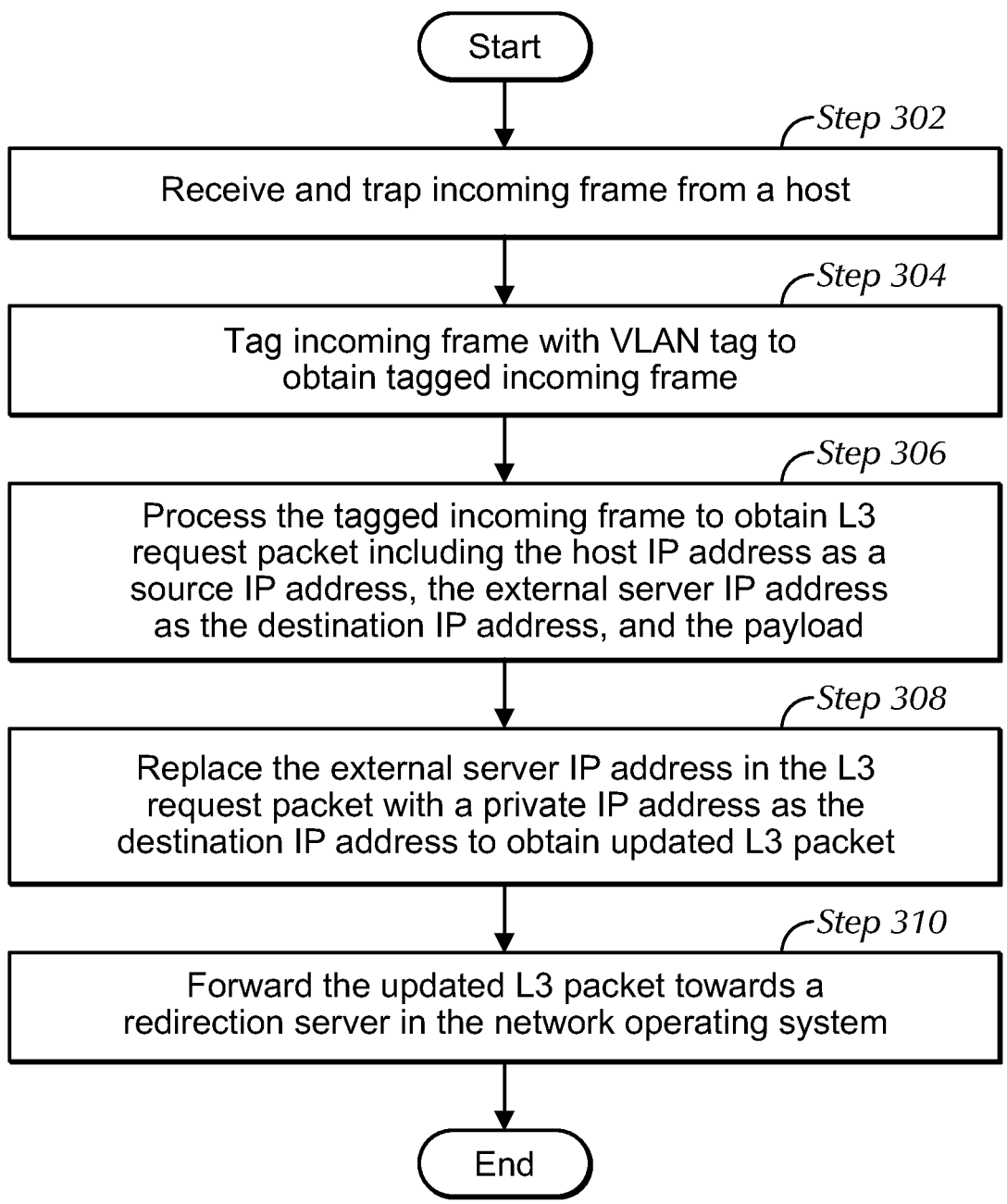
FIG. 3A shows a flowchart describing a method for processing an incoming frame in accordance with one or more embodiments of the disclosure disclosed herein.
Figure 3B:
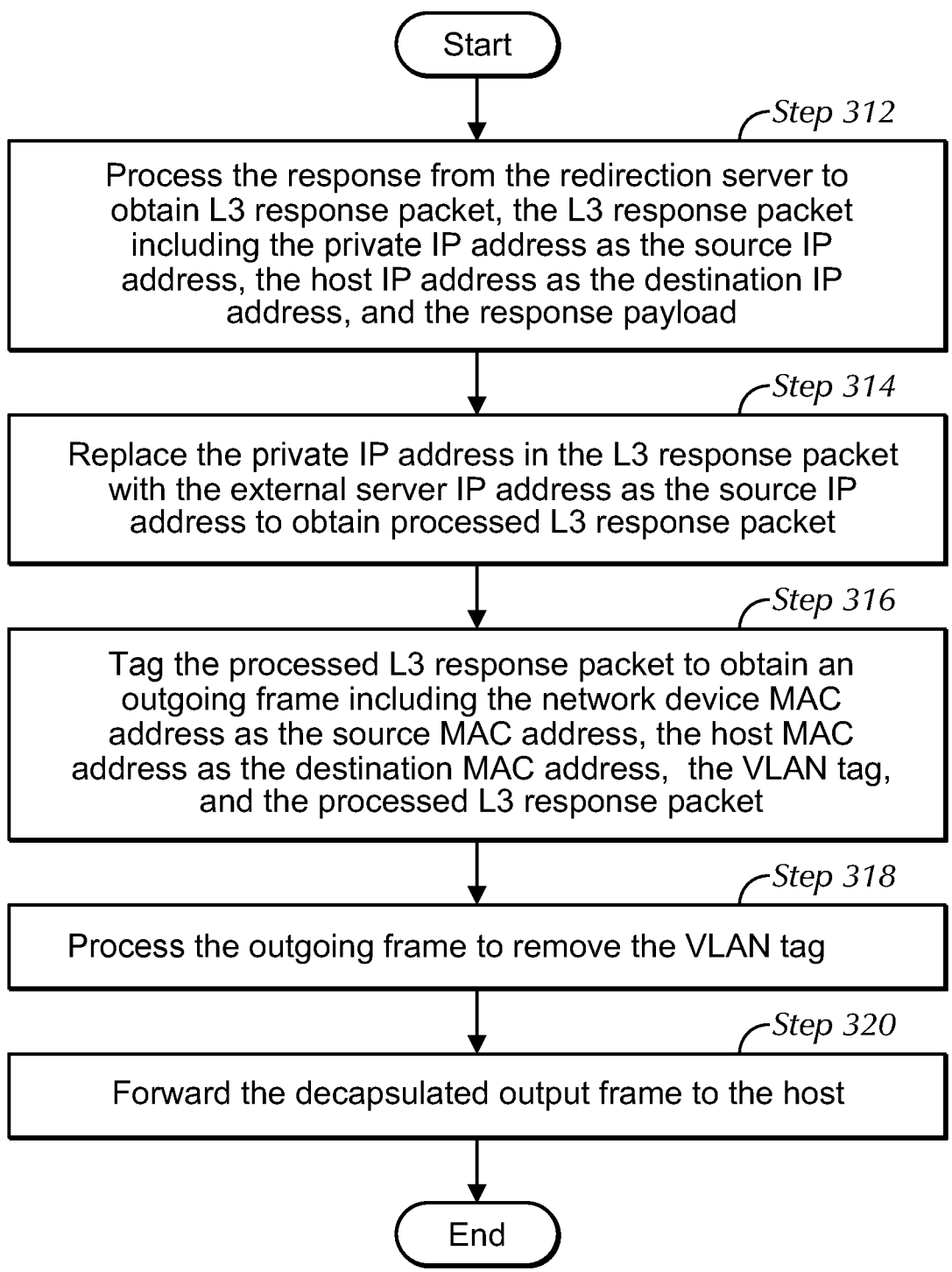
FIG. 3B shows a flowchart describing a method for processing a redirect payload from a redirection server in accordance with one or more embodiments of the disclosure disclosed herein.

In an embodiment of the disclosure, the network device hardware (202) includes ports, memory (e.g., ternary content-addressable memory), one or more special purpose computing devices with functionality to receive L2 frames, determine whether to forward the L2 frame, drop the L2 frame, and/or provide the L2 frame to a control plane (e.g., the operating system kernel and the network operating system) to further process the L2 frame (see e.g., FIGS. 3A, 3B). The special purpose hardware may be, for example an application-specific integrated circuit (ASIC) (not shown)

In an embodiment of the disclosure, the network device hardware (202) receives an incoming L2 frame from a host, such as one of the hosts 102A-102N (in FIG. 1), through an ingress port of the network device (200) (not shown), and forwards the incoming frame to an L2 processing module (e.g., L2 processing module 204) for further processing. In an embodiment of the disclosure, the network device hardware (202) receives an outgoing frame from an L2 processing module (e.g., L2 processing module 204) and forwards the outgoing frame through an egress port (not shown) of the network device (200) to the host.

In one embodiment of the disclosure, the L2 processing module (204) may be one or more computing devices functionally equipped to facilitate, in a request path, tagging an incoming frame with a VLAN tag, the incoming frame trapped by a network device hardware (e.g., 220). In a redirect path from a redirection server to a host, the L2 processing module (204) may be one or more computing devices further functionally equipped to facilitate removal of the VLAN tag from an outgoing frame received from a southbound NOS interface (e.g., 2101B) of an operating system kernel (e.g., 206).

In one embodiment of the disclosure, the L2 processing module (204) is a physical or virtual device that may be used for performing various embodiments of the disclosure. The physical device may correspond to any physical system with functionality to implement one or more embodiments of the disclosure. The physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In one embodiment of the disclosure, the L2 forwarder (e.g., 216) implements functionality to: (i) extract an L3 packet from a trapped incoming frame with a VLAN tag; (ii) store an L2 header and the VLAN tag, both obtained from the incoming frame; (iii) transmit the L3 packet onto an interface of an operating system kernel (206); and (iv) publish L3-to-L2 mapping information derived from the L2 header to a redirection server for the redirect response. Additional detail about the operation of the L2 forwarder is provided in FIGS. 3A-5B below.

In one embodiment of the disclosure, the operating system kernel (206) is a virtualized private namespace environment with isolated services and resources relative to the remaining components of the network device (200) shown in FIG. 2. The resources of the operating system kernel (206) are exclusive to the namespace. Services such as destination network address translation (DNAT) and Transmission Control Protocol are also performed in isolation in operating system kernel (206). In an embodiment of the disclosure, the operating system kernel (206) is a Linux kernel with virtualized processing functionality on L3 packets received from an L2 forwarder (e.g., 216). The disclosure may be implemented using other operating systems without departing from the disclosure. Additional detail about the operation of the operating system kernel is provided in FIGS. 3A-5B below.

In one embodiment of the disclosure, the internal interface (212) of the operating system kernel (206) is a virtualized pass-through interface directing traffic between the L2 forwarder (216) of the NOS (208) and the L3-L4 processing module (214) of the operating system kernel (206). In one embodiment of the disclosure, in the request path, the internal interface (212) receives an L3 packet from the L2 forwarder (216) and transmits the received L3 packet to the L3-L4 processing module (214) for processing, and in a redirect path, the internal interface (212) receives a processed L3 response packet from the L3-L4 processing module (214) and transmits the received processed L3 response packet to the L2 forwarder (216) for tagging. In one embodiment of the disclosure, the internal interface is implemented as TUN interface, e.g., a virtual IP point-to-point interface. In this embodiment, the NOS may send an L3 packet to (and receive an L3 packet from) the L3-L4 processing module. The TUN interface may be implemented by the NOS (208) (or by the operating system kernel (206)) and is associated with a private IP address. The private IP address may be a static IP address. The private IP address may be a selection from a range of private IP addresses. The private IP address may be selected from a range of IP addresses reserved for loopback addresses, i.e., IP addresses that are configured to enable a device (e.g., a network device) to send datagrams to itself and not in conflict with an IP address of a host or server of the system, such as the system of FIG. 1. The private IP address is not exposed to a network administrator or externally to network device (200).

The northbound NOS interface (210A) is a virtualized pass-through interface that in a request path, receives trapped incoming frames from the southbound NOS interface (2101B) and directs the received trapped incoming frames to the L2 forwarder (216). In a redirect path, the northbound NOS interface (210A) receives an outgoing frame from the L2 forwarder (216) and directs the received outgoing frame to the southbound NOS interface (2101B).

The southbound NOS interface (210B) is generally a pass-through interface that in a request path, receives trapped incoming frames, tagged with a VLAN tag (e.g., a VLAN tag corresponding to the VLAN in which the host is operating), from the L2 processing module (204) and directs the received tagged trapped incoming frames onto the northbound NOS interface (210A). In a redirect path, the southbound NOS interface (2101B) receives outgoing frames from the northbound NOS interface (210A) and directs the received outgoing frames to the L2 processing module (204).

In some embodiments, the L3-L4 processing module (214) processes an L3 packet received from the internal interface (212). The received L3 packet includes a request payload. The request payload may be an HTTP[S] message with a web page address, for example, a web page address of an external server(s) (e.g., 110, in FIG. 1). In an embodiment of the disclosure, the L3-L4 processing module (214) is equipped to implement a destination network address translation (DNAT) feature (e.g., DNAT (422), in FIG. 4) when processing the L3 packet from the internet interface (212).

The DNAT feature of the L3-L4 processing module (214) replaces the external server(s) IP address of the L3 packet, received from the internal interface (212), with an operating system kernel IP address while the L3 packet is en route to the redirection server (220). The DNAT feature of the L3-L4 processing module (214) replaces the private IP address with the external server(s) IP address in an (redirect) L3 response packet on the packet's way back from the redirection server (220). In an embodiment of the disclosure, the DNAT feature of the L3-L4 processing module (214) may be replaced with a transparent proxy. In an embodiment of the disclosure, the L4 module of the L3-L4 processing module (214) may be a transmission control protocol (TCP) functionality implementation known to those skilled in the art. The L3-L4 processing module (214) strips the L3 header and L4 payload from the L3 packet extracting the request while the L3 packet is en route to the redirection server (220). On a return path, L3-L4 processing module (214) tags a redirect packet, received from the redirection server (220) with an L3 header while the response is en route to the L2 forwarder (216) and ultimately to the host. Additional detail about the operation of the L3-L4 processing module is provided in FIGS. 3A-5B below.

In one embodiment of the disclosure, the L3-L4 processing module is part of the network operating system. In another embodiment of the disclosure, the L3-L4 processing module is a custom L3-L4 processing module that is made by a third-party and installed in the network operating system.

In one embodiment of the disclosure, the redirection server (e.g., 220) is a physical or virtual device that may be used for facilitating performing various embodiments of the disclosure. The physical device may correspond to any physical system with functionality to implement one or more embodiments of the disclosure.

In one embodiment of the disclosure, the redirection server includes executable instructions (stored in a non-transitory computer readable medium (not shown)), which when executed, enable the redirection server to perform or assist in performing one or more methods described below (see e.g., FIGS. 3A, 3B).

In one or more embodiments of the disclosure, the redirection server (220) may be implemented as any type of server with functionality for: (i) receiving a request payload from an operating system kernel (e.g., 206); (ii) receiving L3-to-L2 mapping information from an L2 forwarder (e.g., 216); and (iii) generating and transmitting a redirect response to the operating system kernel. For example, consider the scenario where the request payload is an arbitrary web address. The redirection server (220) matches the request payload with a corresponding VLAN tag and an L2 header, both saved in the L2 header cache (218) en route to the redirection server (220). The L2 header includes the host MAC address. Based on the VLAN tag and the host MAC address, the redirection server (220) generates the redirect response (e.g., HTTP[S] 302 redirect), which includes a captive portal uniform resource locator (URL).

One skilled in the art will recognize that the architecture of the network device is not limited to the components shown in FIG. 2. For example, the network devices may each include components not shown in FIG. 2 or include alternate or fewer components as those shown in FIG. 2. In another example, while FIG. 2 shows various components in the operating system kernel and other components in the network operating system (208), all of the components may be implemented within the network operating system (208). Further, while the operating system kernel (206) and the network operating system (208) are shown as distinct components, operating system kernel (206) may be part of the network operating system (208). In such scenarios, the operating system kernel 206 shown in FIG. 2 may correspond to an isolated execution environment with the network operating system (208).

FIG. 3A shows a flowchart describing a method for processing an incoming frame in accordance with one or more embodiments described herein. The method of FIG. 3A may be performed by, for example, a network device (e.g., 100, FIG. 1 or 200, FIG. 2). Other components illustrated in FIGS. 1-2 may perform or assist in performing the method of FIG. 3A without departing from the disclosure. Further, one or more steps in FIG. 3A may be performed concurrently with one or more steps in FIG. 3B.

While the various steps in the flowchart shown in FIG. 3A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 302, an incoming frame is received from a host (e.g., one of the hosts 102A-102N, in FIG. 1) to access an external server (e.g., a webpage hosted by an external server). The incoming frame is trapped based on satisfying certain policies. In one embodiment, the incoming frame is an L2 frame that may include an L2 header with an L3 packet. The L3 packet of the incoming frame may in turn include an L3 header with a payload. The payload of the incoming frame is an HTTP[S] request to access a webpage hosted by any external server. The L2 header may include a host MAC address, e.g., the MAC address of the host that originated the L2 frame, as the source MAC address of the incoming frame. The L2 header may further include a network device MAC address, the MAC address of a network device (e.g., 100, in FIG. 1), e.g., the nexthop in the path from the host to the external server, as the destination MAC address of the incoming frame. In one embodiment of the disclosure, the source MAC address may be the MAC address of another network device that is interposed between the network device (i.e., the network device performing the method shown in FIG. 3A) and the host.

Continuing with the discussion of FIG. 3A, the L3 packet may include the IP address of the host as the source IP address. The L3 packet may further include an external server IP address as the destination IP address.

Continuing with the discussion of FIG. 3A, in step 302, the network device traps the incoming frame. In an embodiment of the disclosure, any HTTP[S] traffic from a host triggers the network device to trap the incoming frame. In an alternative embodiment, access to certain web sites may be allowed while access to other web sites may be denied. For example, per the programmed access control list (ACL) rules in the network device hardware (e.g., 202), the network device may permit traffic to public web servers where clients could browse the web without authenticating but may deny traffic to certain private web servers pending successful authentication. In the latter scenario, the network device implements a redirection strategy.

In one embodiment of the disclosure, the network device traps the incoming frame pursuant to certain ACL rules programmed into the network device hardware of the network device. The ACL rules may be generated from an authentication server after the authentication server starts an authentication session.

In step 304, the L2 processing module (e.g., 204, FIG. 2) of the network device tags the trapped incoming frame with a VLAN tag. The VLAN tag corresponds to the VLAN in which the host that transmitted the incoming frame is operating.

In step 306, the network device processes the VLAN tag incoming frame to obtain the L3 packet. In one embodiment of the disclosure, the VLAN tag incoming frame is processed by stripping the VLAN tag and the L2 header, storing the stripped VLAN tag and the L2 header in the L2 header cache, and forwarding the L3 packet to an operating system kernel (e.g., 206, in FIG. 2). As discussed above, the L3 packet may be forwarded to the operating system kernel (or, more specifically, the L3-L4 processing module executing therein) using an Internal Interface (e.g., a TUN interface). In an embodiment of the disclosure, the redirect response may reach the internal interface because a default route on the operating system kernel points to the internal interface.

In step 308, at the L3-L4 processing module, the external server IP address in the L3 packet is replaced with the private IP address as the destination IP address to obtain an updated L3 packet. Replacing the destination IP address of the L3 packet is a measure to ensure the HTTP[S] request reaches the redirection server. The operating system kernel maintains the external server IP address such that the external server IP address can replace the private IP address (see e.g., FIG. 3B). In one embodiment of the disclosure, the private IP address is a loopback address e.g., 127.0.0.1. Other IP addresses may be used without departing from the disclosure.

In step 310, the updated L3 packet is forwarded towards a redirection server (e.g., 220, in FIG. 2) in the network operating system (NOS) (e.g., 208, in FIG. 2).

In one embodiment of the disclosure, the header of the updated L3 packet is removed by the NOS to obtain the payload. The payload is then provided to the redirection server for further processing. The redirection server processes the payload to generate a redirect response. In an embodiment of the disclosure, the redirect response may be generated in accordance with the HTTP/1.0 specification and specify response status code "302" and the URL of the captive portal. The redirect response is not limited to the HTTP code 302 and can be other available redirection codes in accordance with the HTTP/1.1 (e.g., codes 303, 307) that may be utilized with a corresponding HTTP server. The redirect response may then be transmitted from the redirection server to the L3-L4 processing module.

FIG. 3B shows a method for processing a redirect payload from a redirection server in accordance with one or more embodiments described herein. The method of FIG. 3B may be performed by, for example, a network device (e.g., 100, FIG. 1 or 200, FIG. 2). Other components illustrated in FIGS. 1 and 2 may perform or assist in performing the method of FIG. 3B without departing from the disclosure. Further, one or more steps in FIG. 3B may be performed concurrently with one or more steps in FIG. 3A.

While the various steps in the flowchart shown in FIG. 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 312, a redirect response is received from a redirection server (e.g., 220, in FIG. 2) by the L3-L4 processing module and processed to obtain an L3 response packet. The L3 response packet includes the IP address of the operating system kernel (e.g., 206, in FIG. 2) from which a corresponding request payload was generated and transmitted to the redirection server. The L3 response packet further includes the IP address of a host originating the request payload (e.g., one of the hosts (102A, 102N), in FIG. 1). The redirect response from the redirection server is the payload of the L3 response packet.

In step 314, the private IP address in the L3 response packet is replaced with the external server IP address (from step 308 of FIG. 3A) as the source IP address to obtain a processed L3 response packet. The processed L3 response packet is then sent to the L2 forwarder via the internal interface (e.g., the TUN interface).

In an embodiment of the disclosure where the network operating system uses a transparent proxy in place of DNAT, steps 308 (in FIG. 3A) and 314 are unnecessary and need not be performed. That is, in embodiments employing transparent proxy, the destination IP address need not be rewritten in the request path, such as shown at step 308 of FIG. 3A, and the source IP address need not be rewritten in the redirect/return path, such as shown at step 314 of FIG. 3A. However, the L3 packet that is ultimately received by the L2 forwarder in step 316 (discussed below) has the same content regardless of whether the L3-L4 processing module implements DNAT or a transparent proxy. In the latter scenario, the transparent proxy includes functionality to store the necessary state information about the L3 packet received by the L3-L4 processing module in step 306 in order to generate an L3 header that includes the external server IP address as source IP address and the host IP address as the destination IP address.

In step 316, the processed L3 response packet is received by the L2 forwarder and tagged to obtain an outgoing frame.

In an embodiment of the disclosure, an L2 forwarder (e.g., 216, in FIG. 2) tags the L3 response packet with a cached VLAN tag and L2 header (from step 306, in FIG. 3A). Accordingly, the outgoing frame includes the network device MAC address as the source MAC address, the host MAC address as the destination MAC address, the VLAN tag, and the processed L3 response packet. In one embodiment of the disclosure, the source MAC address may be the MAC address of another network device that is interposed between the network device (i.e., the network device performing the method shown in FIG. 3B) and the external server.

In step 318, the outgoing frame is processed to remove the VLAN tag of step 316 because the frame is ready for transmission back to the host and the VLAN tag is no longer required. In an embodiment of the disclosure, an L2 processing module (e.g., 204, in FIG. 2) performs the aforementioned processing of the outgoing frame in step 318.

In step 320, the processed output frame is transmitted towards the host. In an embodiment of the disclosure, a network device hardware (e.g., 202, in FIG. 2) forwards the processed output frame to the host.

In an embodiment of the disclosure, the ACL rules initially programmed into the network device hardware are removed in response to the successful completion of the second step of the authentication to allow subsequent frames to the captive portal to flow web traffic from the host through the network device.

EXAMPLE

Figure 4:
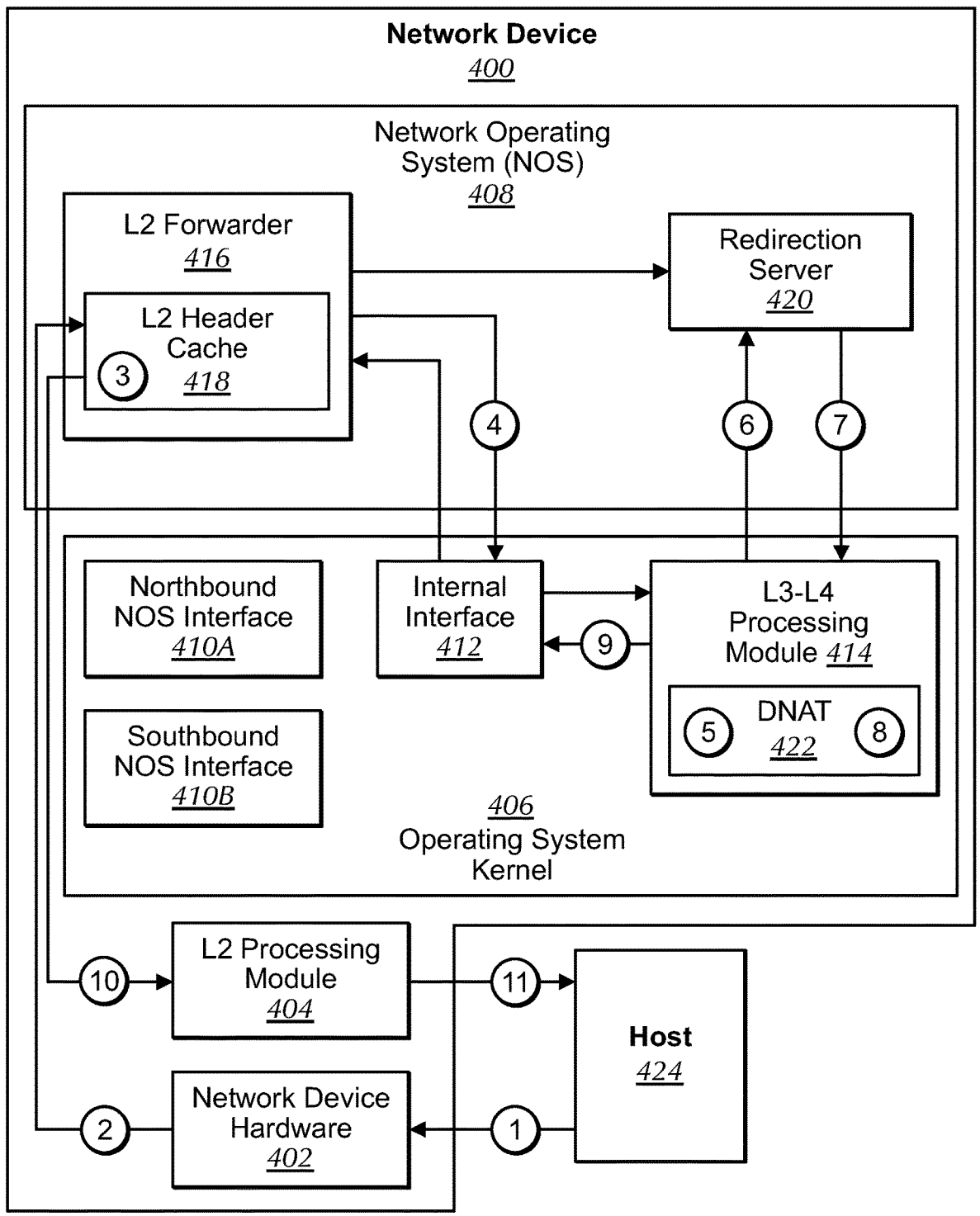
FIGS. 4-5B show an example in accordance with one or more embodiments of the disclosure.
Figure 5A:
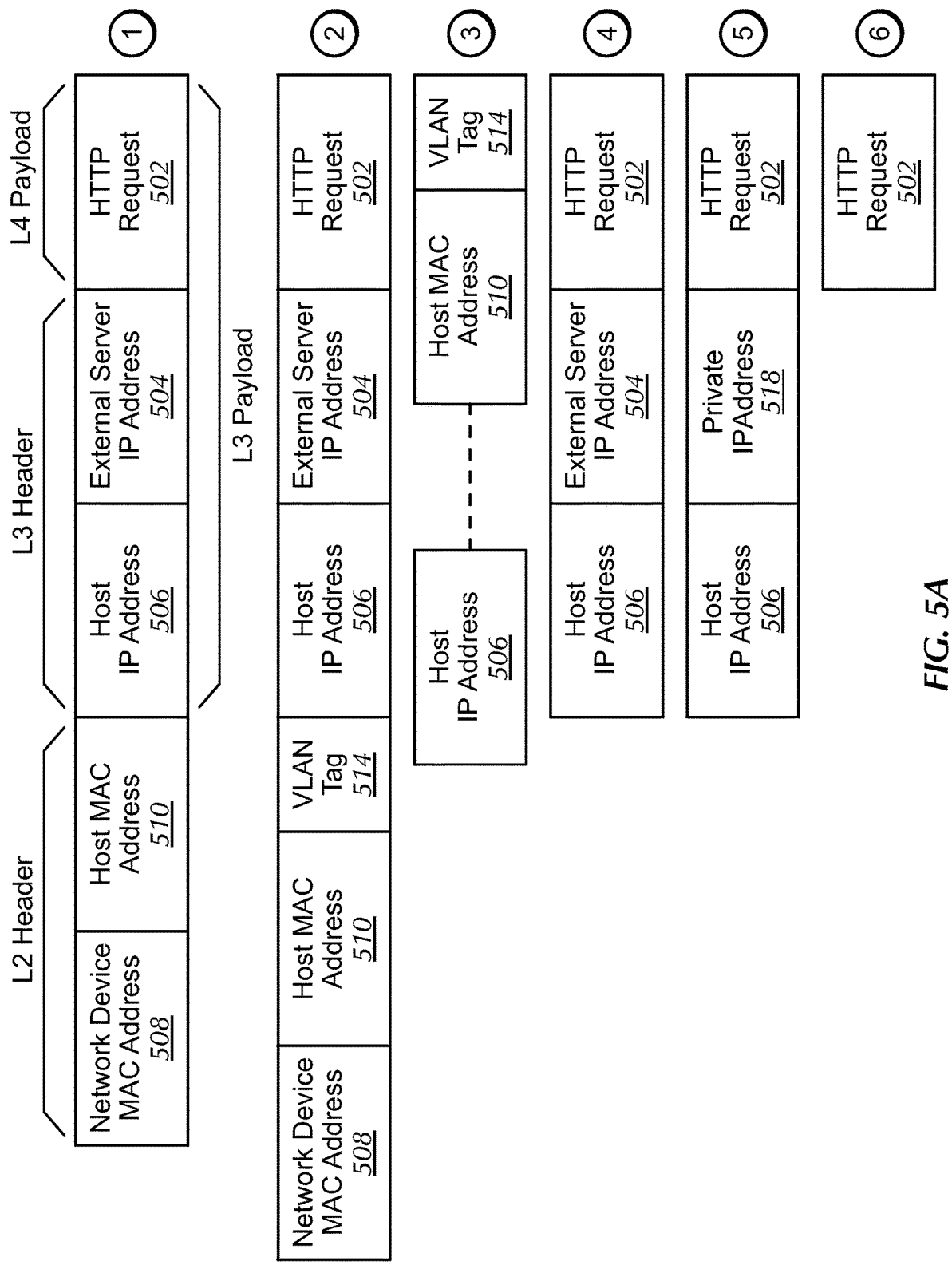
Figure 5B:
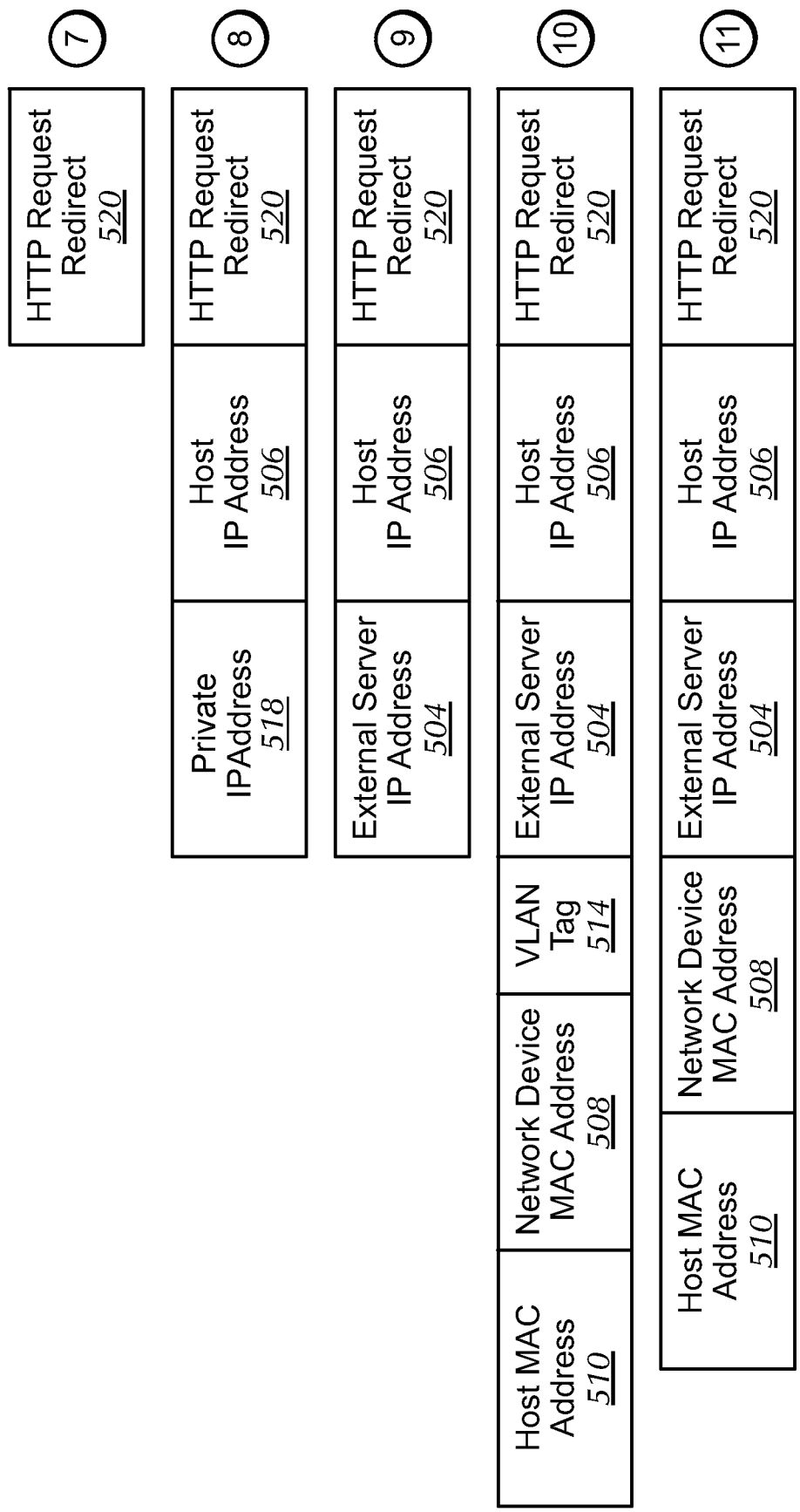

FIGS. 4, 5A, and 5B show an example in accordance with one or more embodiments of the disclosure. The example is not intended to limit the disclosure. FIG. 4 shows an example in accordance with one or more embodiments of the disclosure. More specifically, FIG. 4 shows an exemplary network device in accordance with one or more embodiments of the disclosure.

FIG. 5A shows the frame, packet, and/or payload that is transferred from a host through a network device shown in FIG. 4 to a redirection server. The numbering in the brackets (e.g., [1]) corresponds to the numbering in the circles shown in FIGS. 4 and 5A.

FIG. 5B follows the frame, packet, and/or payload example of FIG. 4 that is transferred from a redirection server to a host. The numbering in the brackets (e.g., [7]) corresponds to the numbering shown in FIGS. 4 and 5B.

With reference to FIGS. 4, 5A, and 5B, consider a scenario in which a network device receives and traps web traffic, i.e., an incoming frame (e.g., incoming frame [1], in FIG. 5A), from a host. The incoming frame in this example includes an HTTP request (502) to an external server that is hosting a website. Prior to receiving the incoming frame, the host has already been authenticated using, e.g., its MAC address, by an Authentication and Authorization Server (AAA Server) (e.g., authentication server (104), in FIG. 1). The AAA Server, after authenticating the MAC address of the host, initiates an update of an ACL on the network device to allow the host into the restricted network and enable the network device to capture the web request in the incoming frame and perform a web redirection.

The network device (400) receives and traps an incoming frame [1], shown in FIG. 5A, from a host (424), where the incoming frame includes the network device MAC address (508) as the destination MAC address, the host MAC address (510) as the source MAC address, the Host IP address (506) as the source IP address, the external server IP address (504) as the destination Ip address, and the HTTP request (502). The network device (400) traps the incoming frame pursuant to certain access control list (ACL) rules programmed into the network device hardware (402).

The L2 processing module (404) tags the trapped incoming frame with a VLAN tag (514) to generate a VLAN tagged frame [2] and forwards the VLAN tagged frame onto the L2 forwarder (416). The L2 forwarder (416) strips and saves the L2 frame header and the VLAN tag of the VLAN tagged frame [3] in an L2 header cache (418) and generates an L3 request packet [4]. The L2 forwarder (416) forwards the L3 request packet on to internal interface (412). An L3-L4 processing module (414) receives and processes the L3 packet by replacing an external server IP address with a private IP address (518) of the operating system kernel (406) as the destination address while the IP source address remains the host IP address to obtain an updated L3 packet [5]. The updated L3 packet is processed by the L3-L4 processing module (and/or the networking stack) of the network operating system in order to extract the request payload (e.g., HTTP Request (502) [6]), and the request payload is forwarded to the redirection server (420).

The redirection server (420) generates the redirect payload (e.g., the HTTP[S] 302 Redirect (520)) [7] and sends it to the L3-L4 processing module. The L3-L4 processing module (414) of the operating system kernel, as part of the transmission of the redirect payload to the kernel, adds the L3 header to the redirect payload to generate an L3 response packet [8]. The L3-L4 processing module (414), then processes the L3 response packet using DNAT (422), which replaces the private IP address (518) with the external server IP address (as the source IP address) in the L3 response packet [9].

The L3-L4 processing module (414) forwards the processed L3 response packet to the internal interface (412), which then forwards the processed L3 response packet to the L2 forwarder (418). The L2 forwarder tags the processed L3 response packet with the saved VLAN tag and L2 frame header (with the source and destination address fields swapped) from the L2 header cache (418) and forwards the tagged redirect frame to the L2 processing module (404) [10]. The L2 processing module (404) processes the redirect frame to remove the VLAN tag and passes the VLAN tag-free redirect frame onto the host (424) [11].

The host subsequently processes the redirect payload, which may connect a browser executing on the host with the captive portal to authenticate the user.

Upon successful completion of the captive portal authentication session (e.g., the captive portal (e.g., 108, in FIG. 1) finds a match of the user authentication credentials with a captive portal user authentication credential), the captive portal communicates the completion of the authentication session to an authentication server (e.g., 104). The authentication server issues a RADIUS change of authorization (CoA) packet to the network device (400) to signal the completion of the captive portal authentication to the network device (400). In response to the CoA packet from the authentication server, the network device hardware (402) removes the ACL rules responsible for trapping the incoming frame [1].

END OF EXAMPLE

Figure 6:
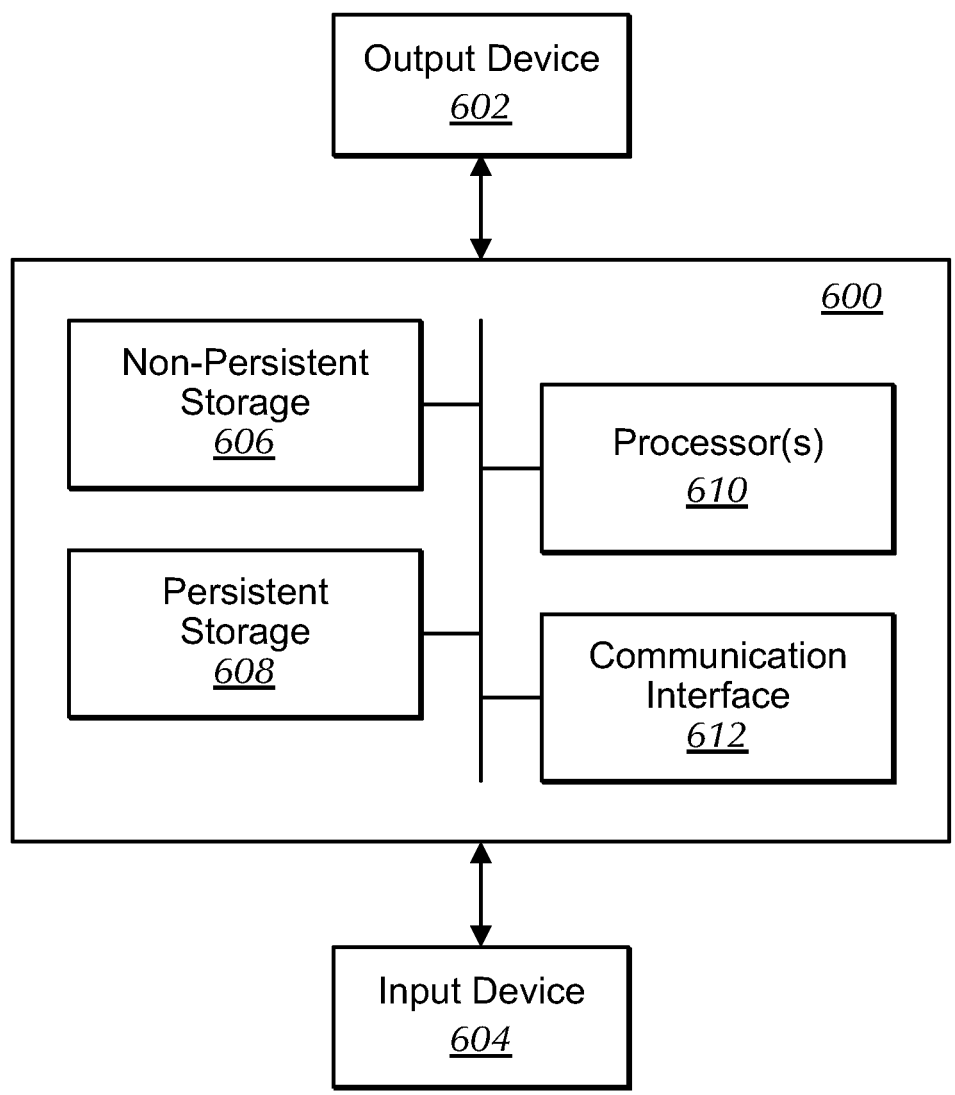
FIG. 6 shows an example host in accordance with one or more embodiments described herein.

As discussed above, embodiments of the disclosure may be implemented using computing devices. FIG. 6 shows a diagram of a computing device in accordance with one or more embodiments of the disclosure. The computing device (600) may implement an embodiment of a host (e.g., (102A-102N), in FIG. 1). The computing device (600) may include one or more computer processors (610), non-persistent storage (606) (e.g., volatile memory, such as random access memory (RAM), cache memory), persistent storage (608) (e.g., a hard disk, an optical drive such as a compact disk (CD) drive or digital versatile disk (DVD) drive, a flash memory, etc.), a communication interface (612) (e.g., Bluetooth® interface, infrared interface, network interface, optical interface, etc.), input devices (604), output devices (602), and numerous other elements (not shown) and functionalities. Each of the components illustrated in FIG. 6 is described below.

In one embodiment of the disclosure, the computer processor(s) (610) may be an integrated circuit for processing instructions. For example, the computer processor(s) may be one or more cores or micro-cores of a processor. The computing device (600) may also include one or more input devices (604), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the disclosure, the computing device (600) may include one or more output devices (602), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (610), non-persistent storage (606), and persistent storage (608). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for redirecting a user to a captive portal, the method comprising:
   by a network device:
   trapping an incoming frame originating from a host, the incoming frame comprising a request directed to an external server;
   in response to determining that the user of the host has not been authenticated by the captive portal at a time when the incoming frame is trapped:
   modifying a layer 3 (L3) header of the incoming frame to replace a destination IP address of the external server with an IP address of a redirection server;
   forwarding the modified L3 header and a payload of the incoming frame towards the redirection server which is configured to generate a redirection response based on the payload;
   obtaining the redirection response and a second L3 header that specifies the IP address of the redirection server as a corresponding source IP address, wherein the redirection response specifies a URL for the captive portal;
   modifying the second L3 header to replace the corresponding source IP address of the redirection server with the IP address of the external server;
   generating an output frame comprising the modified second L3 header and redirection response; and
   transmitting the output frame towards the host.

2. The method of claim 1, further comprising:
   extracting a layer 2 (L2) header from the incoming frame; and
   after the extracting the L2 header from the incoming frame, storing the L2 header in an L2 forwarding table.

3. The method of claim 1, the method further comprises:
   tagging the incoming frame with a virtual local area network (VLAN) tag to obtain an tagged incoming frame; and
   storing a layer 2 (L2) header from the incoming frame in an L2 forwarding table,
   wherein the L2 header is extracted from the tagged incoming frame and wherein the L2 header comprises the VLAN tag.

4. The method of claim 3, wherein the VLAN tag corresponds to a VLAN in which the host is operating.

5. The method of claim 1, wherein the host is authenticated by an authentication server prior to the host issuing the incoming frame to the network device.

6. The method of claim 1, wherein forwarding the modified L3 header and the payload towards the redirection server comprises forwarding the modified L3 header and the payload to an L3-L4 processing module via an internal interface.

7. The method of claim 6, wherein the internal interface is a TUN interface and operatively connects the L2 forwarder to the L3-L4 processing module.

8. The method of claim 6, wherein the L3-L4 processing module forwards the modified L3 header and the payload to the redirection server using a transparent proxy.

9. The method of claim 6, wherein the L3-L4 processing module modifies the modified L3 header to specify a private IP address as a destination IP address in the L3 header, wherein the modified L3 header is generated prior to the redirection server generating the redirection response.

10. The method of claim 9, wherein the private IP address is a loopback IP address.

11. The method of claim 1, wherein the payload specifies a uniform resource locator (URL) for the external server.

12. A network device, comprising:
    a processor; and
    memory comprising instructions which, when executed by the processor, perform a method, the method comprising:
    trapping, by the network device, an incoming frame originating from a host, wherein the incoming frame comprises a request directed to an external server, the request having a layer 2 (L2) header and a payload, wherein the payload specifies information associated with the external server, wherein the user of the host has not been authenticated by a captive portal at a time when the incoming frame is trapped;
    extracting, by an L2 forwarder of the network device, the L2 header, an L3 header, and the payload from the incoming frame;
    modifying the L3 header to replace a destination IP address of the external server with an IP address of a redirection server;
    forwarding, by the L2 forwarder after the extracting, the modified L3 header and the payload towards the redirection server, wherein the redirection server is configured to generate a redirection response based on the payload;
    encapsulating the redirection response to obtain an L3 response packet;
    modifying a second L3 header of the L3 response packet to specify the IP address of the external server as a source IP address and a host IP as the destination IP address;
    encapsulating the L3 response packet using information from the L2 header to obtain an output frame comprising the modified second L3 header and wherein the redirection response specifies a URL for the captive portal; and
    transmitting the output frame towards the host.

13. The network device of claim 12, further comprising:
after the extracting the L2 header from the incoming frame, storing the L2 header in an L2 forwarding table.

14. The network device of claim 13, encapsulating the redirection response using information from the L2 header to obtain an L3 response packet, the L2 header obtained from an L2 forwarding table.

15. A method for redirecting a user to a captive portal, the method comprising:
by a network device:
trapping an incoming frame originating from a host, wherein the incoming frame comprises a request directed to an external server,
processing the incoming frame to obtain an L3 packet, wherein the L3 packet comprises a payload and a destination address which is an external server IP address;
modifying the L3 packet to replace the external server IP address with an IP address of a redirection server executing on the network device;
transmitting the L3 packet towards the redirection server, wherein the redirection server is configured to generate a redirection response based on the payload;
generating, after the transmitting, a second L3 packet specifying the redirection server IP address as a source IP address of the second L3 packet and comprising the redirection response;
modifying the second L3 packet to replace the redirection server IP address with the external server IP address;
encapsulating the second L3 packet using the L2 header to obtain an output frame; and
transmitting the output frame towards the host.

16. The method of claim 15, wherein processing the incoming frame further comprises:
associating the incoming frame with a virtual local area network (VLAN) tag to obtain an tagged incoming frame;
extracting the L2 header from the tagged incoming frame, wherein the L2 header comprises the VLAN tag; and
storing the L2 header in an L2 forwarding table.

17. The method of claim 16, further comprising encapsulating the second L3 packet using the L2 header obtained from the L2 forwarding table to obtain the output frame.

18. The method of claim 16, wherein the VLAN tag corresponds to a VLAN in which the host is operating.

19. The method of claim 16, transmitting the L3 packet towards the redirection server comprises forwarding the L3 packet using a TUN interface.

20. The method of claim 19, wherein the private IP address is associated with the TUN interface.

* * * * *